United States Patent
Tang

(10) Patent No.: US 8,935,388 B2
(45) Date of Patent: Jan. 13, 2015

(54) SYSTEMS AND METHODS OF AUTOMATED EVENT PROCESSING

(75) Inventor: Harry Tang, Alpharetta, GA (US)

(73) Assignee: Cox Communications, Inc., Atlanta, GA (US)

(*) Notice: Subject to any disclaimer, the term of this patent is extended or adjusted under 35 U.S.C. 154(b) by 230 days.

(21) Appl. No.: 13/332,036

(22) Filed: Dec. 20, 2011

(65) Prior Publication Data
US 2013/0159504 A1 Jun. 20, 2013

(51) Int. Cl.
*G06F 15/173* (2006.01)

(52) U.S. Cl.
USPC .......................................... 709/224; 709/223

(58) Field of Classification Search
USPC .......................................................... 709/224
See application file for complete search history.

(56) References Cited

U.S. PATENT DOCUMENTS

| | | | |
|---|---|---|---|
| 6,487,208 B1* | 11/2002 | Chirashnya et al. | 370/400 |
| 6,930,985 B1* | 8/2005 | Rathi et al. | 370/254 |
| 7,668,953 B1* | 2/2010 | Sinclair et al. | 709/224 |
| 8,725,864 B2* | 5/2014 | Vaillant et al. | 709/224 |
| 2002/0059546 A1* | 5/2002 | Yonetoku | 714/738 |
| 2002/0188715 A1* | 12/2002 | McKenzie et al. | 709/224 |
| 2004/0168100 A1* | 8/2004 | Thottan et al. | 714/4 |
| 2005/0166099 A1* | 7/2005 | Shyu | 714/47 |
| 2006/0080667 A1* | 4/2006 | Sanghvi et al. | 719/310 |
| 2006/0149990 A1* | 7/2006 | S. et al. | 714/1 |
| 2006/0168203 A1* | 7/2006 | Levillain et al. | 709/224 |
| 2008/0120399 A1* | 5/2008 | Sandstrom | 709/221 |
| 2012/0059921 A1* | 3/2012 | Serban et al. | 709/223 |
| 2012/0254661 A1* | 10/2012 | Tsongas et al. | 714/32 |
| 2013/0159504 A1* | 6/2013 | Tang | 709/224 |
| 2013/0232264 A1* | 9/2013 | Stabile et al. | 709/224 |

* cited by examiner

*Primary Examiner* — Brian P Whipple
*Assistant Examiner* — James Edwards
(74) *Attorney, Agent, or Firm* — Benjamin A. Balser; Balser & Grell IP Law, L.L.P.

(57) ABSTRACT

Systems and methods of automated event processing include at least one of notification extraction, development of event engineering rules, and testing. Notification extraction may include extracting notification information from the documentation. Automatic development of event engineering rules may receive and process each trap for a centralized monitoring system. An example embodiment would work with Netcool monitoring system from IBM. A set of software code or a software program may process and receive the alarms. Example embodiments of the program automate the implementation process for the code. The testing function automates the testing of the alarms. In an example embodiment, rules set parameters to test the alarms to ensure that the code processes the alarms correctly and as expected.

20 Claims, 2 Drawing Sheets

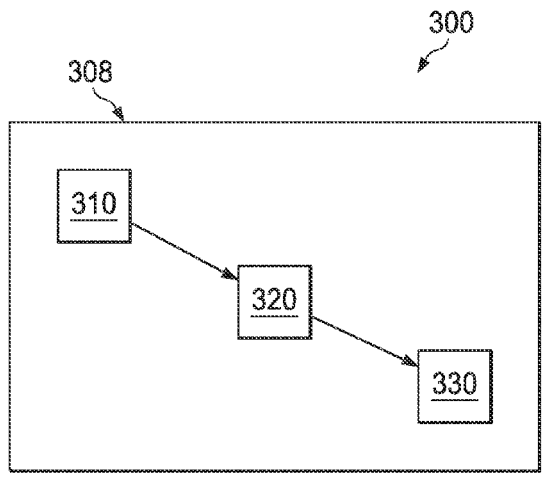
FIG. 3
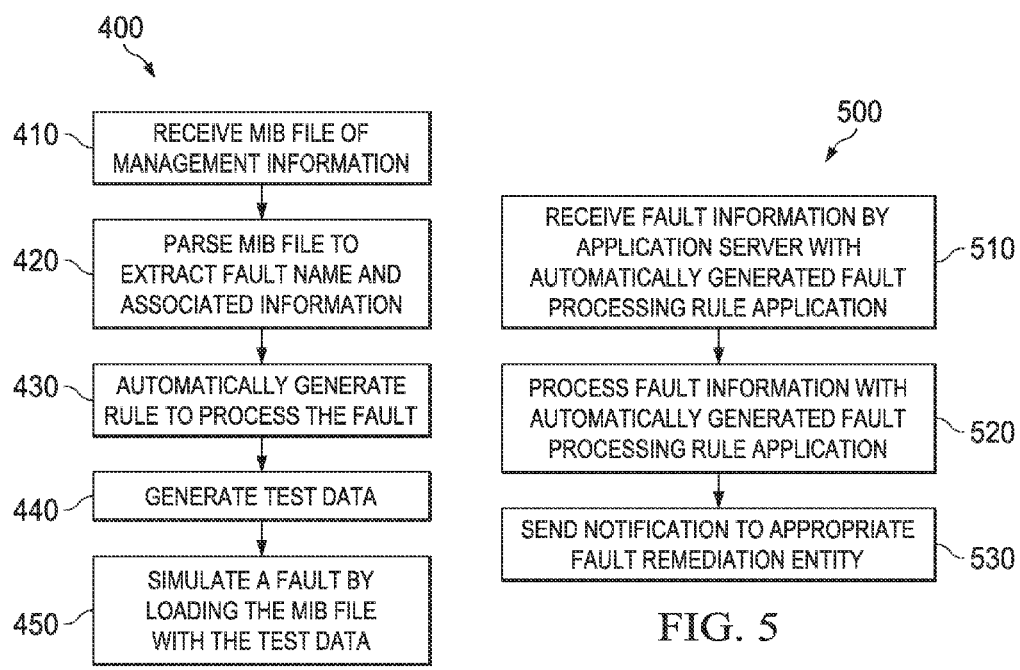
FIG. 4
FIG. 5

SYSTEMS AND METHODS OF AUTOMATED EVENT PROCESSING

TECHNICAL FIELD

The present disclosure is generally related to telecommunications and, more particularly, is related to telecommunication equipment status monitoring.

BACKGROUND

In many organizations, the availability of communications services depends on network equipment that works well, but may not be proactively monitored. The switches and routers in the system are usually quite expensive hardware with well implemented Simple Network Management Protocol (SNMP) interfaces, but the monitoring of these devices is deficient. There are heretofore unaddressed needs with previous monitoring solutions.

SUMMARY

Example embodiments of the present disclosure provide systems of automated event processing. Briefly described, in architecture, one example embodiment of the system, among others, can be implemented as follows: a server configured to access a management information base (MIB) file of; to parse the MIB file to extract fault information; and to automatically generate at least one rule to process the fault.

Embodiments of the present disclosure can also be viewed as providing methods for automated event processing. In this regard, one embodiment of such a method, among others, can be broadly summarized by the following steps: accessing a management information base (MIB) file of management information; parsing the MIB file to extract fault information; and automatically generating at least one rule to process the fault.

BRIEF DESCRIPTION OF THE DRAWINGS

FIG. 3 is a system block diagram of an example embodiment of the probe server of FIG. 2.

FIG. 4 is a flow diagram of an example embodiment of a method of automatic event processing.

FIG. 5 is a flow diagram of an example embodiment of a method of automatic event processing.

DETAILED DESCRIPTION

Figure 1:
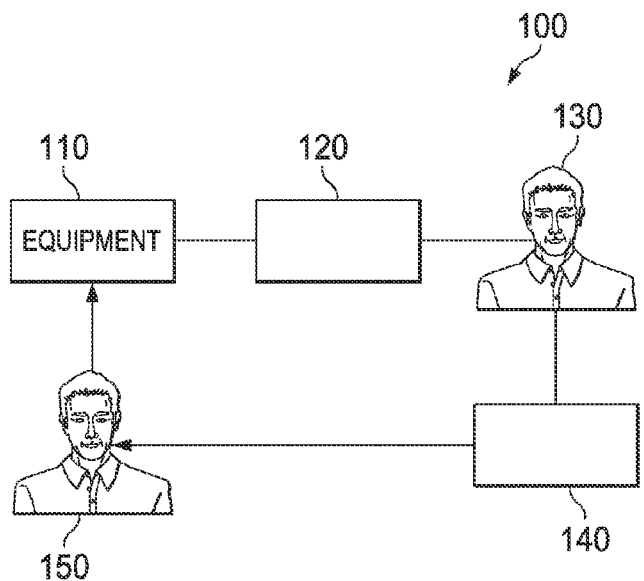
FIG. 1 is a system block diagram of a system of alarm notification.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Simple Network Management Protocol (SNMP) is an Internet-standard protocol for managing devices on IP networks. Devices that typically support SNMP include routers, switches, servers, workstations, printers, modem racks, and more. SNMP is used mostly in network management systems to monitor network-attached devices for conditions that warrant administrative attention. SNMP is a component of the Internet Protocol Suite as defined by the Internet Engineering Task Force (IETF). It consists of a set of standards for network management, including an application layer protocol, a database schema, and a set of data objects.

SNMP presents management data in the form of variables on the managed systems, which describe the system configuration. These variables can then be queried (and sometimes set) by managing applications. In typical SNMP uses, one or more administrative computers called managers have the task of monitoring or managing a group of hosts or devices on a computer network. Each managed system executes, at all times, a software component called an agent, which reports information via SNMP to the manager. The protocol also permits active management tasks, such as modifying and applying a new configuration through remote modification of these variables. The variables accessible via SNMP are organized in hierarchies. These hierarchies, and other metadata (such as type and description of the variable), are described by Management Information Bases (MIBs).

An SNMP-managed network consists of three key components: managed device, agent—software which can run on managed devices, and network management system (NMS)—software which runs on the manager. A managed device is a network node that implements an SNMP interface that allows unidirectional (read-only) or bidirectional access to node-specific information. Managed devices exchange node-specific information with the NMSs. Sometimes called network elements, the managed devices can be any type of device, including, but not limited to, routers, access servers, switches, bridges, hubs, IP telephones, IP video cameras, computer hosts, and printers. An agent is a network-management software module that can reside on a managed device or remotely. An agent has knowledge of management information and translates that information to or from an SNMP specific form. A network management system (NMS) executes applications that monitor and control managed devices. NMSs provide the bulk of the processing and memory resources required for network management. One or more NMSs may exist on any managed network.

SNMP itself does not define which information (which variables) a managed system should offer. Rather, SNMP uses an extensible design, where the available information is defined by management information bases (MIBs). MIBs describe the structure of the management data of a device subsystem; they use a hierarchical namespace containing object identifiers (OID). Each OID identifies a variable that can be read or set via SNMP. MIBs use the notation defined by ASN1. The network may send or forward an alarm notification (defined by MIB) to the agent and monitor server.

SNMP operates in the Application Layer of the Internet Protocol Suite (Layer 7 of the OSI model). The SNMP agent receives requests on UDP port 161. The manager may send requests from any available source port to port 161 in the agent. The agent response will be sent back to the source port on the manager. The device may send an alarm notification from the agent to the manager. The manager receives notifications Traps and InformRequests) on port 162. The agent may generate notifications from any available port. When used with Transport Layer Security or Datagram Transport Layer Security, requests are received on port 10161 and traps are sent to port 10162. SNMPv1 specifies five core protocol data units (PDUs). Two other PDUs, GetBulkRequest and InformRequest were added in SNMPv2 and carried over to SNMPv3.

One particular SNMP protocol data unit (PDU) is the trap. A trap is an asynchronous notification from agent to manager. An example trap includes the current sysUpTime value, an OID identifying the type of trap, and optional variable bindings. Destination addressing for traps is determined in an application-specific manner typically through trap configuration variables in the MIB. The format of the trap message was changed in SNMPv2 and the PDU was renamed SNMPv2-Trap.

Disclosed example embodiments of systems and method of automated event processing concern the automation of network equipment SNMP trap monitoring rules. In an example implementation, a Netcool application has been used to monitor the network devices in the field and process the SNMP traps. Although a Netcool application is used in example embodiments, the disclosed systems and methods are applicable to any system with SNMP traps.

Example embodiments of automated event processing may include at least one of notification extraction, development of event engineering rules, and testing. Notification extraction may include extracting notification information from the documentation. Development of event engineering rules may automate a software program to receive and process each trap for a centralized monitoring system. An example embodiment would work with Netcool monitoring system from IBM. A set of software code or a software program may process and receive the alarms. Example embodiments of the program automate the implementation process for the code. The testing function automates the testing of the alarms. In an example embodiment, rules set parameters to test the alarms to ensure that the code processes the alarms correctly and as expected.

Communications equipment, from manufacturers such as Cisco, Nortel, etc., may use the SNMP trap alarm communications. Netcool or some other monitoring software may be implemented as a centralized monitoring system running through the network. In an example embodiment, at least one probe is implemented close to the devices that they are being remotely monitored. The probes may be implemented for all devices in that physical area. When an SNMP alarm is generated and followed through the local probe and the probe processes the alarm, the monitoring system may receive an alarm from different pieces of equipment or devices. The alarms are processed and are forwarded to the centralized Netcool application, for example.

The Netcool application accesses a local database or a centralized database and, in previous implementations, a display server so that a technician may pull the alarm from the database. The alarm may be pulled at a very high level or down to the printed circuit board level. If the service is broken or if a data point is near a predetermined threshold, then the alarms may be queued and SNMP alarms may be forwarded to a probe. Then the probe can further process the alarm and send it to the centralized monitoring application, such as one being hosted in a remote location. Then those are forwarded to the operators who are monitoring the alarms through a central application. In an example embodiment, the alarm lists, for example, router 123 with card number 3 and port number 4, and the problem (not working properly or the temperature of the whole card is too high, for example). The possible SNMP alarms generated by each piece of equipment are analyzed.

A resulting report may have thousands of SNMP alarms. The structure of each SNMP alarm must be understood which may be very time consuming and labor intensive. In the disclosed systems and methods of automated event processing, the alarms are classified, for example, by properties or attributes in the alarms. In an example embodiment, the code is installed on a probe server. In testing the process, simulated SNMP alarms are generated to test the development code. Errors may be simulated even before the equipment is functional to test the functionality of the automation system.

Example embodiments of the systems and methods of automated event processing disclosed herein include automatically parsing management information base (MIB) files for SNMP traps and associated parameters, generating rules for processing the parsed files for use by an SNMP probe, and testing the rules in a simulated environment.

In an example embodiment, an MIB file is parsed to produce an SNMP definition, including the associated object identifier (OID), severity, description, and associated parameters. An MIB is a database object that may be monitored by a fault management system. Various network equipment vendors follow the SNMP protocol to edit or generate the MIB file for their equipment, though the exact format may vary. The disclosed methods include a program, for example, a Java program, which processes the details of the MIB files of the vendor to extract the trap name, the OID, description, and its associated parameter information. In an example embodiment, the extracted information is assembled in a text file separated by tab demarcation or CSV format file.

The vendor of the particular device preferably follows an industry standard, such as SNMP v2c when reporting alarms. If the vendor provides several files for a single piece of equipment, those files may be concatenated into a single file so that all parent and child relationships may be defined in a single file.

An example embodiment of a parsing Java program processes the integrated MIB file, and extracts all information for each SNMP trap by at least one of the following steps. The trap name may be identified by using the keyword NOTIFICATION-TYPE. The severity value may be extracted using the key word "#SEVERITY". The description of the trap may be extracted using key word "DESCRIPTION". The summary of the trap may be extracted by using key word "SUMMARY". The current dot value and its parent name may be extracted by using the last line and key word "::=". The parent/ancestor dot value may be recursively traced until the top enterprise value for the vendor's company is found.

In the same section, a list of associated passed-in parameters may be extracted (if they exist) using key word "OBJECTS {". For each parameter from above step, the entire MIB file may be parsed to find the parameter definition using key word "OBJECT-TYPE". In the same section where the parameter is defined, the parameter type may be extracted by using key word "SYNTAX".

In the same section for the parameter, the current dot value and its parent name may be extracted using key word "::=". The parameter's parent/ancestor dot value may be recursively traced until the top enterprise value for the vendor's company is found. In an example embodiment, the extracted information is assembled in a text file separated by tab demarcation. This data may be used for the automation step.

An example program is:

```
import java.io.*;
public class MibParser{
    RandomAccessFile mibF ;
    RandomAccessFile trapDef ;
    public MibParser( ){
        try{
            mibF = new RandomAccessFile("c:/starent.mib", "r");
            trapDef = new RandomAccessFile("c:/traps.def", "rw");
```

```
        }catch (Exception e){
            System.out.println("MibParser constructor got
exception e "+e.toString( ));
        }
        return;
    }
    public static void main (String args[ ]) throws
java.io.IOException
    {
        try{
            MibParser parser = new MibParser( );
            boolean startSec=false;;
            boolean endSec;
            //parse mib file file.
            String tmpSec=new String( );
            int first=1;
            String lineStr;
            String trapName = new String( );
            String desc = new String( );
            String severity = new String( );
            String trapNum = new String( );
            while ((lineStr = parser.mibF.readLine( )) != null){
                //System.out.println("lineStr = "+lineStr);
                //if find NOTIFICATION-TYPE parse it to get
all the related information
                if(lineStr.contains(" NOTIFICATION-
TYPE")){
                    if(first == 1){
                        first++;
                        continue;
                    }
                    startSec = true;
                    tmpSec =
lineStr.substring(lineStr.indexOf("star"));
                    tmpSec = tmpSec.trim( );
                    if(first==2){
System.out.println("line="+tmpSec);
                        first = 3;
                    }
                    //before it reaches next "
NOTIFICATION-TYPE" it should extract all infors.
                    lineStr = "";
                }
                if(startSec==true){
                    tmpSec = tmpSec + lineStr + "\n";
                }
                if(lineStr.contains("::= { starentTraps ")){
                    endSec=true;
                    parser.processNotif(tmpSec);
                    startSec=false;
                    tmpSec = null;
                }
            }
            parser.mibF.close( );
            parser.trapDef.close( );
        }catch (Exception e){
            System.out.println("mibparser got exception e
"+e.toString( ));
        }
        return;
    }
    public void processNotif(String notifSec)
    {
        try{
            String trapName = new String( );
            String desc = new String( );
            String severity = new String( );
            String trapNum = new String( );
            int descIndex;
            int i;
            //System.out.println("tmpSec = "+notifSec);
            String outStr = new String( );
            //process line by line
            trapName = notifSec.substring(0,
notifSec.indexOf("NOTIFICATION-TYPE")).trim( );
            if((descIndex =
notifSec.indexOf("DESCRIPTION"))>-1){
                //it has description. looking for " and empty
line.
                descIndex = notifSec.indexOf("\"");
                desc =
getDescription(notifSec.substring(descIndex+1));
            }
            //get severity
            if((i=notifSec.indexOf("--#SEVERITY"))>-1){
                severity = notifSec.substring(i+11,
notifSec.indexOf("\n", i));
                severity= severity.trim( );
            }
            //find trap number
            if((i=notifSec.indexOf("::= { starentTraps "))>-1){
                int j = notifSec.indexOf("}", i);
                trapNum = notifSec.substring(i+18, j);
                trapNum = trapNum.trim( );
            }
            String objId = ".1.3.6.1.4.1.8164.2."+trapNum;
            String trap = objId
+"\t"+"\t"+trapNum+"\t"+trapName+"\t"+"\t"+desc+"\t"
                            +severity +"\n";
            this.trapDef.writeBytes(trap);
        }catch (Exception e){
            System.out.println("processNotif got exception e
"+e.toString( ));
        }
    }
    public String getDescription(String descrip)
    {
        try{
            String tmp = new String( );
            String desc = new String( );
            String[ ] listStrs = descrip.split("\n");
            int quoteIndex;
            for(int index=0; index < listStrs.length; index++){
                tmp = listStrs[index];
                tmp = tmp.trim( );
                desc = desc + tmp + " ";
                if((quoteIndex=desc.indexOf("\""))>0){
                    desc = desc.substring(0, quoteIndex-1);
                    break;
                }
                if(tmp.length( )==0){
                    break;
                }
            }
            System.out.println("desc=\n"+desc);
           return desc;
        }catch (Exception e){
            System.out.println("getDescription got exception e
"+e.toString( ));
        }
        return null;
    }
}
```

An example resulting file is a Trap/Alarm OID of .1.3.6.1.4.1.8164.2.1

| Enterprise ID | Trap Name | Description | Vendor Severity | Cox Severity | Type | Action able | Summary |
|---|---|---|---|---|---|---|---|
| .1.3.6.1.4.1.8164.2.1 | starCardTemp-Overheat | The card has reached a temperature beyond its safe operating range. | CRITICAL | 5 | Problem | Yes | [Card % d] Card has overheated; measured temperature % d C. |
| .1.3.6.1.4.1.8164.2.2 | starCardTemp-OK | The temperature of the card is now within its safe operating range. This notification is only generated if the card has previously generated a starCardTempOverheat notification. | INFORMATIONAL | 1 | Clear | No | [Slot % d] Temperature OK (% d C.) |
| .1.3.6.1.4.1.8164.2.3 | starCardReset | A reset operation has been invoked on the card. This trap is obsolete | MAJOR | 4 | Problem | Yes | [Card % s-% d] Card has been reset |

In an example embodiment, the systems and methods of automated event processing automatically generates the rules to process each trap. A rule editor process may assign variables for each trap based on the parameter name extracted from the parsing step. The rule editor process may also set the severity for the trap, and set the trap summary and comment section from the trap description.

An example set of rules automatically generated by the java program follows:

```
. case ".1.3.6.1.4.1.8164.2":
    @Agent = "Starent Notifications"
    @Class = ""
    @NEVendor = "STARENT"
    @NEModel = "ST16 or ST40"
    @ServiceName = "WIRELESS"
    @NEType = "PDSN-HA"
    #@SystemName = "MIDDLE GEORGIA"
    switch ($specific-trap) {
        case "1":
            # starCardTempOverheat
            #       OBJECTS { starSlotNum,
            #                starCardTemperature }
            #
            # #SUMMARY "[Card %d] Card has overheated; measured temperature %d C"
            # The card has reached a temperature beyond its safe operating range.
            $starSlotNum = $1
            $starCardTemperature = $2
            @AlertGroup = "starCardTemp"
            @AlertKey = $1
            @SubResource = $1
            @Severity = 5
            @Type = 1
            @Condition = "Card Temperature"
            @Summary = "The card "+ $starSlotNum + " has reached a temperature "+ $starCardTemperature + " beyond its safe operating range."
            @AlarmText = @Summary
            @Identifier = @Node + " " + $enterprise + ":" + $specific-trap + " " + @SubResource + " " + @AlertGroup + " " + @AlertKey + " " + @Type + " " +@Severity + " "+@Agent + " " + @Manager
        case "2":
            # starCardTempOK
            #       OBJECTS { starSlotNum,
            #                starCardTemperature }
            #
            # #SUMMARY "[Slot %d] Temperature OK (%d C)"
            # The temperature of the card is now within its safe operating range.
            $starSlotNum = $1
            $starCardTemperature = $2
            @AlertGroup = "starCardTemp"
            @AlertKey = $1
            @SubResource = $1
            @Severity = 1
            @Type = 2
            @Condition = "Card Temperature"
            @Summary = "The temperature("+$starCardTemperature+") of the card "+$starSlotNum +" is now within its safe operating range."
            @AlarmText = @Summary
            @Identifier = @Node + " " + $enterprise + ":" + $specific-trap + " " + @SubResource + " " + @AlertGroup + " " + @AlertKey + " " + @Type + " " +@Severity + " "+@Agent + " " + @Manager
```

In an example embodiment, a test generator program, which may be written in Java, for example, generates trap test data using information from the parsing step. The test data generator program may assign a proper value based on the type of parameter. For example, parameter type text string may be assigned for "DisplayString", and parameter type integer may be assigned for "Integer32" and "Gauge32". The newly constructed test data may be output to a test data text file with each field separated by tab demarcation. An SNMP test simulator may read in the test data to test each individual SNMP trap. Alternatively, the test program may perform a load test by repeatedly sending a large number of traps to a probe target destination.

An example set of test data follows:

```
1   starCardTempOverheat    1.3.6.1.4.1.8164.2.1starSlotNum
    1.3.6.1.4.1.8164.1.2.1.1.1  Integer32(1..48)    10
    starCardTemperature     1.3.6.1.4.1.8164.1.2.1.1.16Gauge32
    200
2   starCardTempOK 1.3.6.1.4.1.8164.2.2starSlotNum
    1.3.6.1.4.1.8164.1.2.1.1.1  Integer32(1..48)    10
    starCardTemperature     1.3.6.1.4.1.8164.1.2.1.1.16Gauge32
    200
3   starCardRebootRequest   1.3.6.1.4.1.8164.2.4starSlotNum
    1.3.6.1.4.1.8164.1.2.1.1.1  Integer32(1..48)    10   starCardType
    1.3.6.1.4.1.8164.1.2.1.1.3  INTEGER 2
```

-continued

| 4 | starCardUp | 1.3.6.1.4.1.8164.2.5starSlotNum | | | |
|---|---|---|---|---|---|
| | 1.3.6.1.4.1.8164.1.2.1.1.1 | Integer32(1..48) | 10 | starCardType | |
| | 1.3.6.1.4.1.8164.1.2.1.1.3 | INTEGER 2 | | | |
| 5 | starCardVoltageFailure | 1.3.6.1.4.1.8164.2.6starSlotNum | | | |
| | 1.3.6.1.4.1.8164.1.2.1.1.1 | Integer32(1..48) | 10 | starCardType | |
| | 1.3.6.1.4.1.8164.1.2.1.1.3 | INTEGER 2 | | | |

FIG. 1 provides a block diagram of system 100 of remote event processing. Equipment 110 is monitored by event processing module 120. Event processing module 120 may produce a list of alarms or events that based on the monitoring of probes on equipment 110. These events include, but are not limited to, temperature, processor functionality, processor usage, memory functionality, memory usage, and power good, among others. Agent 130 accesses the list of alarms and/or events produced by event processing module 120 to determine if equipment 110 needs attention, servicing, reboot, replacement, or some other action. If agent 130 makes such a determination, agent 130 enters a work order in module 140. Module 140 may send a notice to technician 150, who performs the necessary and/or requested action on equipment 110.

Figure 2:
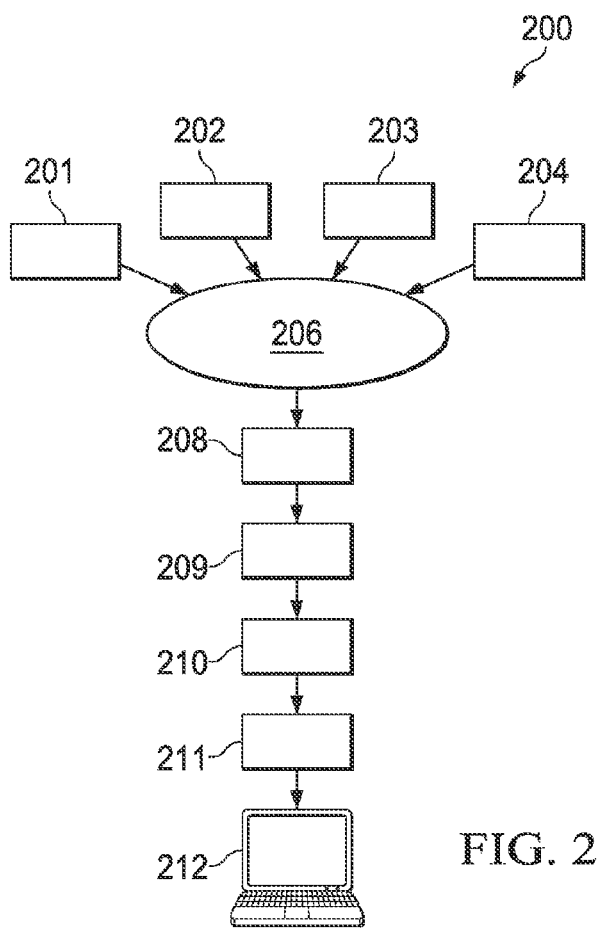
FIG. 2 is a system block diagram of an example embodiment of a system of automatic event processing.

FIG. 2 provides a block diagram of system 200, an example embodiment of a system for automated event processing. An example Netcool object server monitoring system may include object servers that the Netcool system provides. An example embodiment includes collection object server 209, aggregation object server 210, and display object server 211. Collection object server 209 collects information from probe server 206. Aggregation object server 210 aggregates the data collected from collection object server 209. Display object server displays the information aggregated by aggregation object server 210. Display object server presents the aggregated information to user 212. In an example embodiment, devices 201, 202, 203, and 204 connect to probe server 208 through network 206. Probe server 208 receives and processes the network for alarms generated by devices 201, 202, 203, and 204, for example, SNMP traps.

FIG. 3 provides system block diagram 300 of an example embodiment of probe server 308. Probe server 308 may be centralized or distributed, such as a server close to a subnetwork to be monitored. In an example embodiment, probe sever comprises one or more of MIB file reader and parser 310, alarm processing rule generator 320, and test data generator 330. Alarmn processing rule generator 320 uses the information from MIB file reader and parser 310, which comprises alarm definitions to generate rules or codes to process the alarms. Test data generator 330 generates test data to automatically simulate alarms for test codes generated from alarm processing rule generator 320. MIB file reader and parser 310 automates what would normally be a manual process. For an MIB file, this may be 400, 800, or 2000 or more alarm definitions, for example. Manually parsing the alarms can be an extremely tedious and time consuming process. This has been automated with the process for reading the MIB file, analyzing the MIB file, and parsing the MIB file to generate the alarm definitions for each alarm, even up to 2000 alarms or more.

Alarm processing rule generator 320 generates alarm processing rules based on alarm definition structures from MIOB file reader and parser 310. Alarm processing rule generator 320 produces the code for processing the real-world alarms. Alarm processing rule generator 320 uses the results from MIB file reader and parser 310 to automatically generate the software codes to process the alarms defined by the MIB file.

Test data generator 330 uses the alarm definitions from MIB file reader and parser 310 to generate simulated test data. Test generator 330 also may generate the testing code which sends the simulated test data to probe server 308. Once probe server 308 receives the simulated alarms sent by test generator 330, it may automatically test the alarm processing rules generated by alarm processing rule generator 320 to verify if the rules are correct or not.

FIG. 4 provides flow diagram 400 of an example embodiment of a method of automated event processing. In block 410, an MIB file of management information is received. In block 420, the MIB file is parsed to extract a fault name and associated information. The fault may be a hard fault or a soft fault, where a hard fault is a failure of the device, system, or routine, and a soft fault is a condition which nears or may lead to a hard fault. In block 430 a rule or code is automatically generated to process the fault. In block 440, test data is generated to simulate a fault condition. In block 450, the database is loaded with the test data to test the simulation.

FIG. 5 provides flow diagram 500 of an example embodiment of a method of automated event processing. In block 510, fault information is received by the application server with the automatically generated fault processing rule application. In block 520, the fault information is processed with the automatically generated fault processing rule application. In block 530, a notification is sent to an appropriate fault remediation entity.

The flow charts of FIG. 4 and FIG. 5 show the architecture, functionality, and operation of a possible implementation of automated event processing software. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiments, including the server, can be implemented in hardware, software, firmware, or a combination thereof. In example embodiments, the logic is implemented in software or firmware that is stored in a memory and that is executed by a suitable instruction execution system. The server includes one or more processing units that are operable to execute computer software instructions and to manipulate data according to the computer software instructions. A processor unit can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums. The server further includes, or is communicatively connected to, volatile and non-volatile memory for storing computer software instructions to be executed by the processing unit(s) and for storing and recalling data related to the tags/modules.

Additionally, the server comprises an operating system that controls and manages operation of the server and that includes computer software instructions executed by the server's processing unit(s). The server further comprises a plurality of computer software and data components that cooperatively cause the server to provide automated event processing functions. The operating system and computer software and data components, according to example embodiments are stored on or by the server's volatile and/or non-volatile memory. In other embodiments, the computer software and data components, or portions thereof, may be stored on or by device(s) that are not part of the server. The computer software and data components include an automated event processing software component having a plurality of computer software instructions that when executed by a processing unit(s) of the server, causes the server to perform according to an automated event processing method described hereinabove.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured media.

Although the present disclosure has been described in detail, it should be understood that various changes, substitutions and alterations can be made thereto without departing from the spirit and scope of the disclosure as defined by the appended claims.

The invention claimed is:

1. A system comprising:
a server processor configured:
to access a management information base (MIB) file of management information;
to parse the MIB file to extract fault information comprising trap name, severity value, trap description, and trap summary, a current dot value and parent name of the fault information extracted by recursive tracing until a top enterprise value for a vendor is determined;
to classify the fault information by at least one parameter in the fault information; and
to automatically generate at least one rule to process the fault.

2. The system of claim 1, wherein the server processor is further configured to generate test data to simulate a fault to test the automatically generated rules.

3. The system of claim 2, wherein the server processor is further configured to simulate a fault by loading the test data generated from the MIB file.

4. The system of claim 1, wherein the server processor is further configured to process the automatically generated fault information.

5. The system of claim 4, wherein the server processor is further configured to send a fault notification to an appropriate fault remediation entity.

6. The system of claim 1, further comprising a network device configured to load the MIB file with fault information.

7. The system of claim 1, wherein automatically generating at least one rule to process the fault comprises assigning variables for each trap based on the parameter name extracted from the parsing, setting the severity for the trap and setting the trap summary and comment section from the trap description.

8. A method comprising:
accessing a management information base (MIB) file of management information;
parsing the MIB file to extract fault information comprising trap name, severity value, trap description, and trap summary, a current dot value and parent name of the fault information extracted by recursive tracing until a top enterprise value for a vendor is determined; and
automatically generating at least one rule to process the fault information, the rule generated by assigning variables for one or more traps in the fault information based on a parameter name extracted from the fault information.

9. The method of claim 8, further comprising generating test data to simulate a fault for testing the automatically generated rules.

10. The method of claim 9, further comprising simulating a fault by loading the test data generated from the MIB file.

11. The method of claim 8, further comprising processing the automatically generated fault information.

12. The method of claim 11, further comprising sending a fault notification to an appropriate fault remediation entity.

13. The method of claim 8, further comprising loading the MIB file with fault information in Simple Network Management Protocol (SNMP) format.

14. The method of claim 13, further comprising setting a severity for the one or more traps and setting a trap summary and comment section for a trap description.

15. A non-transitory computer readable medium for storing software, the software comprising instructions for:
accessing a management information base (MIB) file of management information;
parsing the MIB file to extract fault information comprising trap name, severity value, trap description, and trap summary, a current dot value and parent name of the fault information extracted by recursive tracing until a top enterprise value for a vendor is determined; and
automatically generating at least one rule to process the fault information, the rule generated by assigning variables for one or more traps in the fault information based on a parameter name extracted from the fault information.

16. The computer readable medium of claim 15, further comprising instructions for generating test data to simulate a fault for testing the automatically generated rules.

17. The computer readable medium of claim 16, further comprising instructions for simulating a fault by loading the test data generated from the MIB file.

18. The computer readable medium of claim 15, further comprising instructions for processing the automatically generated fault information.

19. The computer readable medium of claim 18, further comprising instructions for sending a fault notification to an appropriate fault remediation entity.

20. The computer readable medium of claim 15, further comprising instructions for loading the MIB file with fault information.

* * * * *